United States Patent [19]

Young et al.

[11] Patent Number: 5,282,964
[45] Date of Patent: Feb. 1, 1994

[54] BORESIDE FEED HOLLOW FIBER MEMBRANE DEVICE

[75] Inventors: Thomas C. Young, Walnut Creek; Terrence L. Caskey, Concord; Johnny L. Trimmer, Antioch; George E. Mahley, III, Berkeley; Randall A. Yoshisato, Vallejo; John A. Jensvold, Benicia, all of Calif.

[73] Assignee: The Dow Chemical Company, Midland, Mich.

[21] Appl. No.: 20,219

[22] Filed: Feb. 19, 1993

[51] Int. Cl.$^5$ .................................. B01D 63/02
[52] U.S. Cl. .......................... 210/321.8; 210/321.89; 210/500.23
[58] Field of Search ............ 210/321.6, 321.72, 321.78–321.81, 210/321.87–321.89, 500.23

[56] References Cited

U.S. PATENT DOCUMENTS

| | | | |
|---|---|---|---|
| 3,339,341 | 9/1967 | Maxwell et al. | 55/16 |
| 3,442,002 | 5/1969 | Geary et al. | 20/450 |
| 3,716,143 | 2/1973 | Clark | 210/321.87 |
| 3,722,694 | 3/1973 | Agranat | 210/321.89 |
| 3,722,695 | 3/1973 | Sargent et al. | 210/321.89 |
| 3,832,830 | 9/1974 | Gerow | 55/158 |
| 3,977,976 | 8/1976 | Spaan et al. | 210/321.78 |
| 4,237,596 | 12/1980 | Hughes et al. | 55/158 |
| 4,367,139 | 1/1983 | Graham | 210/321.1 |
| 4,378,981 | 4/1983 | Otstot et al. | 55/158 |
| 4,380,460 | 4/1983 | Otstot et al. | 55/158 |
| 4,451,369 | 5/1984 | Sekino et al. | 210/321.1 |
| 4,508,548 | 4/1985 | Manatt | 55/158 |
| 4,517,720 | 5/1985 | Otstot et al. | 55/158 |
| 4,565,630 | 1/1986 | Runkle | 210/321.89 |
| 4,578,190 | 3/1986 | Fowler | 210/321.89 |
| 4,676,808 | 6/1987 | Coplan | 55/158 |
| 4,690,758 | 9/1987 | Leonard et al. | 210/321.89 |
| 4,707,267 | 11/1987 | Johnson | 210/650 |
| 4,734,106 | 3/1988 | Gollan | 55/16 |
| 4,744,900 | 5/1988 | Bratt | 210/321.78 |
| 4,752,305 | 6/1988 | Johnson | 55/16 |
| 4,781,832 | 11/1988 | Takemura et al. | 210/321.8 |
| 4,781,834 | 11/1988 | Sekino et al. | 210/321.88 |
| 4,863,600 | 9/1989 | Leonard et al. | 210/321.89 |
| 4,871,379 | 10/1989 | Edwards | 55/158 |
| 4,881,955 | 11/1989 | Bikson et al. | 55/16 |
| 4,929,259 | 5/1990 | Caskey et al. | 55/158 |
| 4,959,152 | 9/1990 | Nichols | 210/651 |
| 4,961,760 | 10/1990 | Caskey et al. | 35/158 |
| 5,013,331 | 5/1991 | Edwards et al. | 55/16 |
| 5,013,437 | 7/1991 | Trimmer et al. | 210/321.8 |
| 5,053,130 | 10/1991 | Raff et al. | 55/158 |

FOREIGN PATENT DOCUMENTS 2052301A 1/1981 United Kingdom ............ 210/321.8

*Primary Examiner*—Frank Sever

[57] ABSTRACT

The present invention is a bore-fed hollow fiber membrane device which possesses improved shellside countercurrent flow distribution. More specifically, the hollow fiber membrane bundle has a radial Peclét number of about 30 or lower which results in improved fluid recovery and productivity.

16 Claims, 6 Drawing Sheets

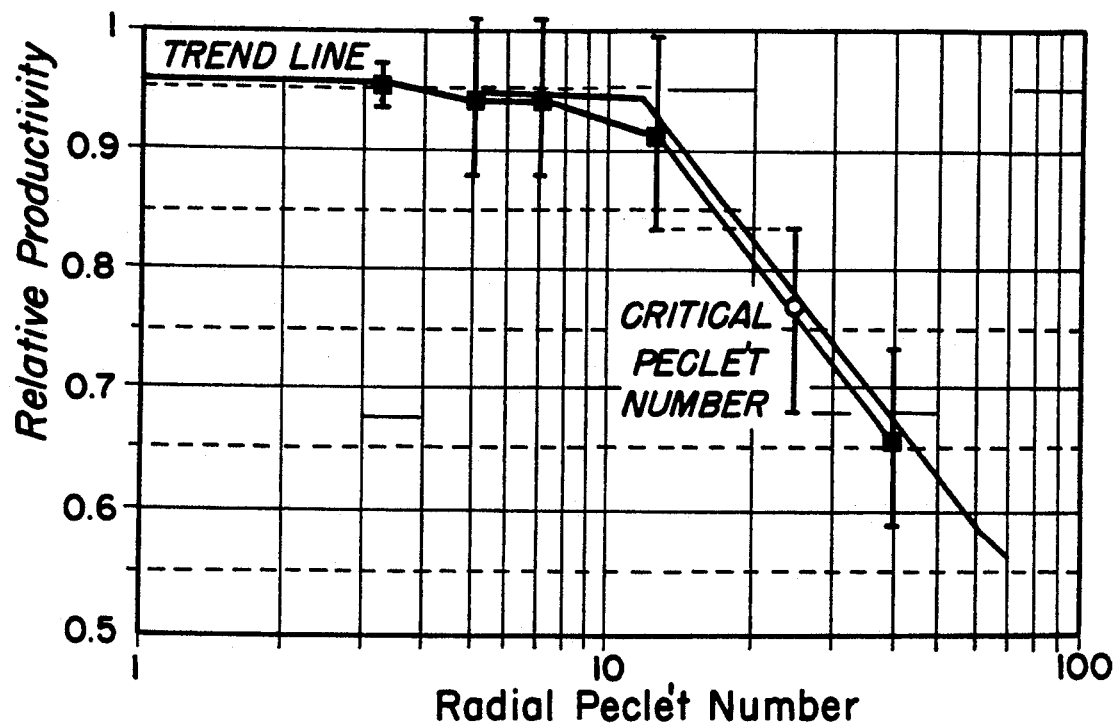
FIG. 4A
FIG. 4B
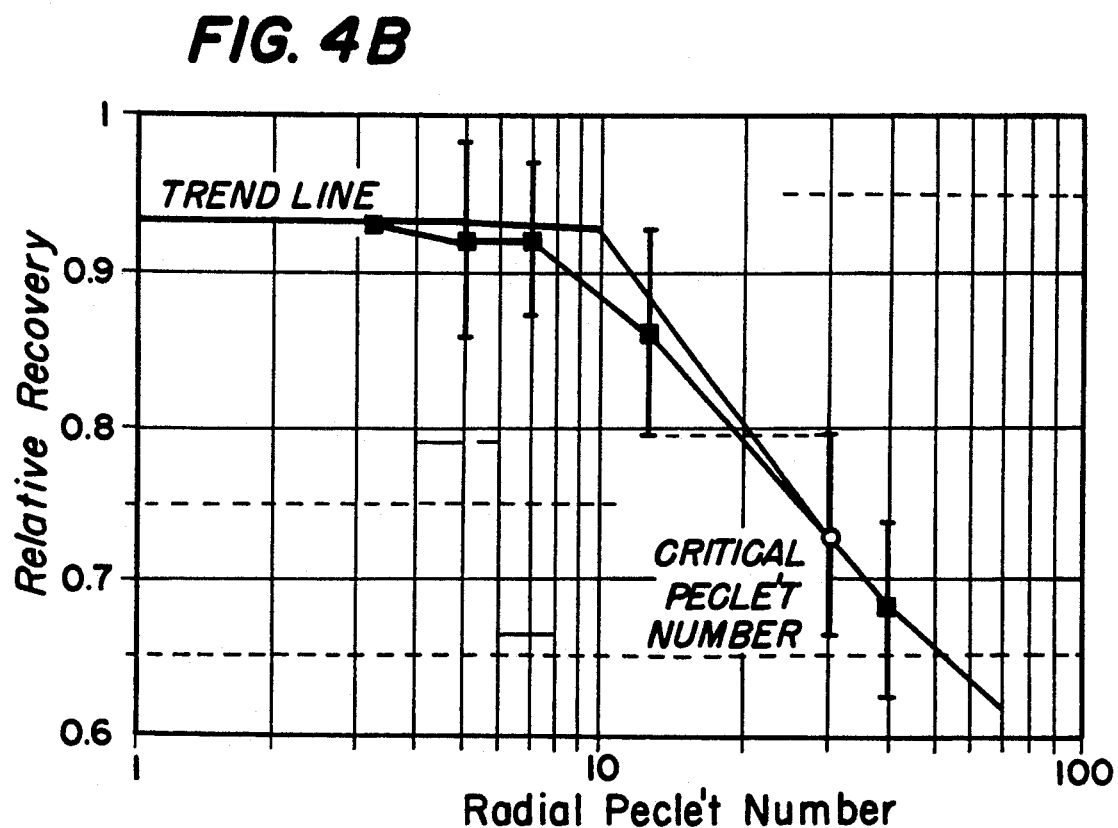

BORESIDE FEED HOLLOW FIBER MEMBRANE DEVICE

BACKGROUND OF THE INVENTION

This invention relates to a hollow fiber membrane device adapted for boreside feed which possesses improved shellside countercurrent flow distribution, resulting in higher productivity while producing a high purity non-permeate product stream.

Several designs for bore-fed hollow fiber membrane devices are known. For example, see U.S. Pat. Nos. 4,871,379; 4,881,955; 4,929,259; 4,961,760; 5,013,331; and 5,013,437. In a boreside feed operation, a mixture of fluids to be separated is introduced into one end of the hollow fiber membrane device such that the fluid mixture flows down the bores (lumens) of the hollow fibers. The fluid which does not permeate through the fibers exits the bores of the fibers at the opposite ends of the fibers, while the fluid permeating through the fibers is removed from the outside of the fibers.

Conventional boreside hollow fiber membrane devices, particularly those designed for separation of gases, typically achieve substantially less than theoretical separation performance (based on membrane separation properties) due to inefficiencies in shellside flow distribution within the device. Generally, conventional bore-fed parallel-wrapped hollow fiber devices achieve only 50 to 65 percent of theoretical productivity, largely due to poor shellside flow distribution.

Conventional techniques for fabricating hollow fiber membrane devices frequently employ bias-wrapping or other methods to promote uniform packing of fibers, thus encouraging countercurrent shellside flow patterns and reducing channeling. See, for example, U.S. Pat. Nos. 3,339,341 and 3,442,002. These methods normally increase the complexity and expense of the device manufacturing process, and often result in a high degree of fiber wastage.

The performance of hollow fiber separation devices is often discussed relative to ideal performance models. Crossflow and countercurrent models are the most common. Both models assume that the fluid fed to the module flows in a direction parallel to the fibers. Because of the selective nature of the membrane, the fluid becomes progressively enriched in one or more components along the length of the fibers and progressively depleted in other components.

The ideal crossflow model assumes that the fluid permeating through the membrane at each point has a composition determined by the ratio of the fluxes through the membrane, that is, the local mole fraction of each component of the permeate is equal to the molar flux of that component through the membrane divided by the total molar flux through the membrane. The physical interpretation of this model is that all fluid permeating through the membrane is withdrawn without mixing with fluid permeating through the membrane at neighboring points.

The ideal countercurrent model assumes that the fluid permeating through the membrane collects and flows in a direction opposite to the flow of the fluid fed to the device. Because the feed fluid becomes progressively depleted in one or more components as it flows down the length of membrane device, the fluid permeating through the membrane also becomes progressively depleted in the same components. By forcing the permeating fluid to flow in a direction opposite the feed flow, the accumulated permeate dilutes the local permeate even more in the depleted components. Since the driving force for separation across the membrane is related to differences in composition, this additional dilution serves to increase the driving force and thus the separation performance of the membrane device. Consequently, ideal countercurrent performance maximizes the separating capability of a membrane device.

The equations describing ideal crossflow and countercurrent performance models are well-known to persons skilled in membrane device fabrication and mathematical methods to solve these equations are also well known.

Many factors can prevent a hollow fiber membrane device from achieving ideal countercurrent performance, including broken fibers, plugged fibers, leaks, non-uniform fiber size and/or properties, axial dispersion, and channeling. The ideal countercurrent model assumes that axial dispersion, diffusion, or mixing is negligible. The stream state (composition, pressure, temperature, and flowrate) inside each fiber is assumed to be identical at a given axial position. The flow is assumed to be perfectly countercurrent; the velocity outside the fibers depends only on the axial position and has no dependence on position perpendicular to the fibers.

Several patents describe methods for improving the performance of a device by inducing countercurrent flow patterns on the outside of the fibers to maximize the driving force for separation. Some patents discuss methods of improving the packing uniformity of the fibers to encourage even shellside flow distribution. For example, U.S. Pat. Nos. 3,339,341 and 3,442,002 describe a method for enclosing fiber bundles in porous elastic sleeves to compress the fibers, thereby increasing the fiber packing density and improving the uniformity of the spacing. This method is said to improve the flow distribution on the outside of the fibers. U.S. Pat. No. 4,308,654 describes a method of enclosing a bundle of hollow fibers in a flexible, impermeable envelope, maintaining a pressure difference across the envelope to compress the fibers together, then inserting the compressed fiber bundle into a shell. This method is also said to improve the flow distribution outside the fibers.

Several patents also discuss methods of baffling to promote countercurrent flow patterns. Outer baffles or shells with an opening at one or more ends are commonly used to force the fluid outside the fibers to flow in a generally countercurrent direction. See, for example, U.S. Pat. Nos. 4,871,379 and 4,781,834. Multiple internal baffles may also be used to promote countercurrent flow. U.S. Pat. Nos. 4,929,259, 4,961,760, and 5,013,437 describe concentric and spiral baffles in cylindrical devices with core tubes to channel flow in the countercurrent direction.

The problem with such methods of improving shellside flow distribution is that the methods of manufacturing such devices greatly increase in cost and complexity without a correspondingly significant improvement in device efficiency.

Another problem associated with conventional hollow fiber membrane devices is that such devices are typically manufactured for standardized productivities or capacities. Such standardization of device productivities frequently results in systems either over or under designed for a given customer's capacity requirements.

What is needed is a hollow fiber membrane device which is adapted for boreside feed that does not require complex manufacturing methods to obtain uniform packing of fibers, yet still achieves performance that substantially approaches theoretical countercurrent performance, including theoretical recovery. What is also needed is a hollow fiber membrane device easily manufactured for a wide range of productivities or capacities.

SUMMARY OF THE INVENTION

The hollow fiber membrane device of this invention comprises:

A. at least two bundles, each bundle comprising a plurality of hollow fiber membranes capable of separating at least one fluid from a feed fluid mixture, each bundle having a first end and a second end and a radial Peclét number of less than about 30, each bundle being contained within a separate and distinct enclosure substantially impermeable to the fluids being separated and arranged together for substantially parallel flow of a feed fluid mixture through each bundle;

B. a first tubesheet comprised of a thermoset or thermoplastic polymeric material located at the first ends of the bundles, arranged such that the hollow fiber membranes are embedded in the first tubesheet and communicate through the first tubesheet and are open on the opposite face of the first tubesheet;

C. a second tubesheet comprised of a thermoset or thermoplastic polymeric material located at the second ends of the bundles opposite the first ends of the bundles, arranged such that the hollow fiber membranes are embedded in the second tubesheet and communicate through the second tubesheet and are open on the opposite face of the second tubesheet;

D. a first end capping means arranged and adapted for attaching and sealing to the first ends of the bundles or enclosures at or near the first tubesheet;

E. a second end capping means arranged and adapted for attaching and sealing to the second ends of the bundles or enclosures at or near the second tubesheet;

F. a means for introducing a feed fluid mixture into the bores of the hollow fiber membranes at the first tubesheet;

G. a means for withdrawing non-permeate fluid from the bores of the hollow fiber membranes at the second tubesheet; and H. a means for withdrawing permeate fluid from the outside of the hollow fiber membranes located at the end nearest the means for introducing fluid into the bores of the hollow fiber membranes at the first tubesheet;

wherein said device possesses substantially countercurrent flow distribution on the shellside relative to the feed fluid mixture within the bores of the hollow fiber membranes.

In a preferred embodiment, the hollow fiber membrane device is useful for separating feed fluids containing a mixture of gases.

The devices of this invention possess high productivity and recovery, while producing a high purity non-permeate product stream. The high recovery of the devices translate into lower operating energy requirements. The devices of this invention are also easily manufactured for a wide range of productivity requirements, with less fiber handling and fiber wastage compared to conventional hollow fiber membrane devices.

BRIEF DESCRIPTION OF THE DRAWING

FIGS. 4A, 4B and 5-8 illustrate the impact of Peclét number on device performance.

DETAILED DESCRIPTION OF THE INVENTION

Figure 1:
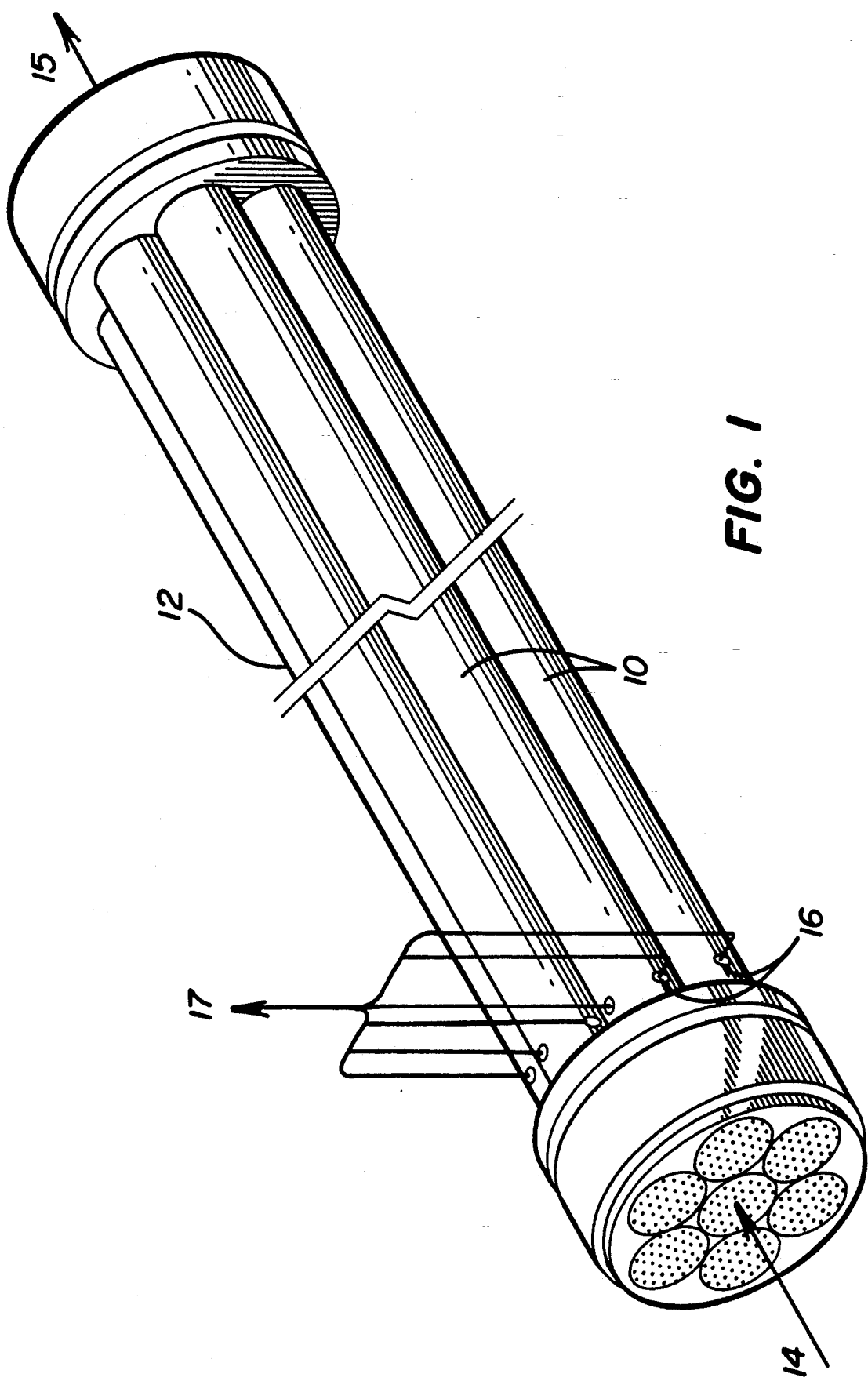
FIG. 1 illustrates a preferred embodiment of the hollow fiber membrane device of this invention.

The hollow fiber membranes useful in devices of this invention are generally formed from a polymer which is capable of separating one or more fluids from one or more other fluids in a fluid mixture. Such hollow fiber membranes may have morphological structures which are non-porous, microporous, symmetric (isotropic), asymmetric (anisotropic), or composite. Non-porous membrane as used herein means a membrane which is dense, that is, substantially free of holes or voids. Asymmetric membrane as used herein means a membrane which possesses at least one discriminating region and at least one porous region, wherein the discriminating and porous regions comprise the same polymer. Composite membrane as used herein means a membrane which possesses at least one discriminating layer and at least one porous layer, wherein the discriminating and porous layers comprise different polymers.

Generally, any polymer which exhibits gas or liquid separation ability may be used to form membranes used in the devices of this invention. Polymers preferred for gas separation membrane materials include unsubstituted and substituted polyolefins, polyamides, polyacetylenes, polytriazoles, polyoxadiazoles, polyphenylene oxides, polyimides, polycarbonates, polyesterearbonates, polyesters, polyarylates, polyethers, polysulfones, polyethersulfones, polybenzoazoles, such as polybenzoxazoles, polybenzothiazoles, polybenzoimidazoles, polybenzobisoxazoles, polybenzobisthiazoles, and polybenzobisimidizoles, and copolymers and physical blends thereof. More preferred polymers for gas separation membrane materials include polymers having in general a rigid structure such as polybenzoxazole or a polymer containing 9,9-bis(3,5-dibromo-4-hydroxyphenyl)fluorene, 9,9-bis(3,5-dichloro-4-hydroxyphenyl)fluorene, hexafluorobisphenol A, tetrahalobisphenol A, tetrahalohexafluorobisphenol A, tetraalkylbisphenol A, or tetraalkylhexafluorobisphenol A moieties selected from the group consisting of polyimide, polyether, polysulfone, polyethersulfone, polyarylate, polyester, polyestercarbonate, polycarbonate, and copolymers and physical blends thereof. Hexafluorobisphenol A as used herein means bisphenol A wherein all six of the hydrogens on the isopropylidene bridging group have been substituted with fluorine moieties. Tetrahalo or tetraalkyl as used herein with respect to bisphenol A means bisphenol A wherein all four of the hydrogens on the aromatic rings are substituted with halo or alkyl moieties respectively. The preparation of such membranes is known to one skilled in the art. See, for example, U.S. Pat. Nos. 3,350,844; 3,709,774; 3,852,388; 3,899,309; 4,468,500; 4,468,501; 4,468,502; 4,468,503; 4,717,393; 4,717,394; 4,772,392; 4,818,254; 4,838,904; 4,840,646; 4,851,014; 4,874,401; 4,880,699; 4,929,405; 4,949,775; 4,955,993; 4,971,695; 4,978,573; 5,000,763; 5,007,945; 5,009,679; 5,013,332; 5,034,026; 5,034,027; 5,042,992;

and 5,042,993; all of which are incorporated herein by reference.

Polymers preferred for liquid separation membrane materials include polyolefins, such as polyethylene, polypropylene, poly-4-methylpentene-1, polytetrafluoroethylene, polyetherketone and polyetheretherketone, polyphenylene sulfide, polyvinylidene fluoride, and polyvinylidene chloride. The preparation of such membranes is known to one skilled in the art. See, for example, U.S. Pat. Nos. 4,115,492; 4,904,426; and 4,927,535; incorporated herein by reference.

The potential susceptibility of a membrane device to degradation in performance associated with channeling can be evaluated by dimensional analysis, a technique well-known to those skilled in chemical engineering. By applying dimensional analysis to the species continuity equations which govern composition profiles for the fluid space outside the fibers, expressions for a characteristic dimensionless group referred to herein as the Peclét number can be derived. The value of the Peclét number indicates the relative importance of convection and diffusion in the transport of mass within a flowing system. A high Peclét number (much greater than one) indicates that convection dominates and the effect of diffusion is small; composition profiles can change rapidly in a system with high Peclét numbers. A small Peclét number (much less than one) indicates that diffusion dominates and the effect of convection is small; composition profiles change slowly in a system with small Peclét numbers. A Peclét number near one indicates a balance between convection and diffusion. For membrane devices, a large Peclét number in the axial direction (along the length of the fibers) is desirable, while a small Peclét number in the radial and angular directions (perpendicular to the fibers) is desirable. Devices that meet these criteria will have performance approaching the countercurrent ideal as long as the fluid flow outside the fibers is generally countercurrent. Complex fabrication methods to obtain uniform fiber packing are not necessary; a simple substantially impermeable outer baffle or shell to force the flow in a generally countercurrent direction used in conjunction with a certain sized bundle is sufficient.

Axial Peclét numbers, $Pe_L$, are defined by equation 1:

$$Pe_L = \frac{4(L_f^2)(\epsilon)(N_{TO})}{(D_f)(1 - \epsilon)(cD_{AB})}.$$

Radial Peclét numbers, $Pe_R$, are defined by equation 2:

$$Pe_R = \frac{(D_b^2)(\epsilon)(N_{TO})}{2(D_f)(1 - \epsilon)(cD_{AB})}.$$

In Equations 1 and 2,
c is the molar density of the fluid outside of the fibers (kg-mole/m³);
$D_{AB}$ is the molar diffusivity of a binary gas pair in the fluid outside of the fibers (m²/s);
$D_b$ is the effective diameter of a fiber bundle (m);
$D_f$ is the outside diameter of the fiber (m);
$\epsilon$ is the volumetric packing fraction of the fiber in the bundle;
$L_f$ is the length of the active region of the fiber in the bundle (m); and $N_{TO}$ is the characteristic total gas flux through the outer surface of a fiber (kg-mole/m²s).

The molar density of the fluid, c, may be determined by measurement or calculated by using any of the valid estimation methods known to chemists or engineers, such as the ideal gas law or other equations of state.

The molar diffusivity, $D_{AB}$, may be estimated from kinetic theory or other valid correlations.

The gas molar binary diffusivity, $D_{AB}$, may be determined by measurement or estimated from gas kinetic theory or from other valid correlations. For multicomponent systems where the separation is between two main components of the feed gas stream (commonly known as "key" components), the diffusivity is evaluated with the key components as the binary gas pair. For multicomponent systems with no clear key components, the diffusivity is evaluated as the largest binary diffusivity for all possible gas pairs.

The effective bundle diameter, $D_b$, is the maximum of the shortest distance between any two points within the cross-section of the fiber bundle, with the distance measured along a path entirely contained within the bundle and perpendicular to the fibers.

The packing factor, or the volumetric packing fraction of the fiber in the bundle, $\epsilon$, is the volume occupied by the fibers divided by the total volume of the fiber bundle.

The active length of the fibers, $L_f$, is the total fiber length minus the length of the fiber that is inactive (encased in tubesheet material or otherwise inactive).

The properties c, $D_{AB}$, and $N_{TO}$ are evaluated at standard reference conditions for the fiber used and the separation of interest. Standard reference conditions are defined as the stream states at the midpoint of the hollow fiber membrane device as predicted by an ideal countercurrent simulation of the separation of interest.

Alternatively, the axial and radical Peclét numbers may be defined based on the overall permeation rate through a working device, as given respectively in Equations 3 and 4:

$$Pe_L = \frac{4(L_f)(\epsilon)(F_{PERM})}{\Pi N_f D_f^2 (1 - \epsilon) cD_{AB}},$$

and $$Pe_R = \frac{D_b^2(\epsilon)(F_{PERM})}{2\Pi N_f D_f^2 L_f (1 - \epsilon) cD_{AB}}.$$

In Equations 3 and 4, $\epsilon$, c, $D_b$, $D_f$, $L_f$, and $D_{AB}$ are as previously defined,
$F_{PERM}$ is the molar flowrate of the permeate leaving the device (kg-mole/s); and
$N_f$ is the number of active fibers in the device.

Most conventional hollow fiber membrane devices for gas separations are engineered so that the axial Peclét number is sufficiently large for negligible axial diffusion, dispersion, or mixing ($Pe_L \geq 100$). However, such conventional devices are also engineered so that the radial Peclét number is too large for the device to be considered radially well mixed ($Pe_R \geq 20$). Thus, most conventional devices are susceptible to performance degradation due to channeling. Consequently, complex fabrication methods that control fiber packing uniformity are necessary to ensure uniform flow distribution and high performance.

The present invention involves forming multiple bundles, each with small radial Peclét numbers, in contrast to the conventional technique of forming a single large bundle with a large radial Peclét number. Consequently, conventional bundle geometries such as described in U.S. Pat. Nos. 4,929,259, 4,961,760 and 5,013,437 result in large radial Peclét numbers, and therefore possess inferior performance compared to devices in accordance with this invention.

The devices of this invention preferably possess at least about 60 percent of the theoretical countercurrent productivity and at least about 80 percent of the theoretical countercurrent recovery. The devices more preferably possess at least about 80 percent of the theoretical countercurrent productivity and at least about 90 percent of theoretical countercurrent recovery. Productivity is defined as the flowrate of the desired product from the membrane device. Recovery is defined as the flowrate of the desired product from the membrane device divided by the flowrate of the feed stream entering the device. Theoretical countercurrent productivity and recovery are obtained from the solution of Equations 5-10 when the desired product composition, pressure, and permeate pressure are specified. Equations 5-10 are easily solved by a variety of standard numerical integration techniques.

$$\frac{dF_f}{dz} = -N_f \Pi D_f \sum_{j=1}^{n} N_j \quad (5)$$
$$F_F = F_{FEED} \text{ at } z = 0 \quad F_F = F_{REJ} \text{ at } z = 2L_{TS} + L_f$$

$$F_F \frac{dx_i}{dz} = -N_f \Pi D_f \left( N_i - x_i \sum_{j=1}^{n} N_j \right) \quad (6)$$
$$x_i = x_{i,FEED} \text{ at } z = 0 \quad x_i = x_{i,REJ} \text{ at } z = 2L_{TS} + L_f$$

$$\frac{dP_F}{dz} = -\frac{128 \mu F_F}{N_f \Pi D_{fi}^4 c} \quad (7)$$
$$P_f = P_{FEED} \text{ at } z = 0 \quad P_F = P_{REJ} \text{ at } z = 2L_{TS} + L_f$$

$$\frac{dF_p}{dz} = -N_f \Pi D_f \sum_{j=1}^{n} N_j \quad (8)$$
$$F_P = 0 \text{ at } z = L_{TS} + L_f \quad F_P = F_{PERM} \text{ at } z = L_{TS}$$

$$F_p \frac{dy_i}{dz} = -N_f \Pi D_f \left( N_i - y_i \sum_{j=1}^{n} N_j \right) \quad (9)$$
$$N_i - y_i \sum_{j=1}^{n} N_j = 0 \text{ at } z = L_{TS} + L_f \quad y_i = y_{i,PERM} \text{ at } z = L_{TS}$$

$$\begin{aligned} N_i &= 0 & \text{at } 0 \leq z \leq L_{TS} \\ &= k_i(P_F x_i - P_P y_i) & L_{TS} \leq z \leq L_{TS} + L_f \\ &= 0 & L_{TS} + L_f \leq z \leq 2L_{TS} + L_f \end{aligned} \quad (10)$$

In Equations 5-10, c, $D_f$, $F_{PERM}$, $L_f$ and $N_f$ are as previously defined.

$D_{fi}$ is the inside diameter of the fibers (m);
$F_F$ is the molar flowrate of the stream in the bore of the fibers at position z (kg-mole/s);
$F_{FEED}$ is the molar flowrate of the feed stream entering the device (kg-mole/s);
$F_p$ is the molar flowrate of the stream outside of the fibers at position z (kg-mole/s);
$F_{REJ}$ is the molar flowrate of the reject stream leaving the device (kg-mole/s);
$k_i$ is the permeance of component i through the fibers (kg-mole/cm² kPa s);

$L_{TS}$ is the length of the fiber encased in the tubesheet (cm);
$N_i$ is the flux of component i permeating through the fiber at position z (kg-mole/cm² s);
$P_F$ is the pressure inside the bore of the fibers at position z(kPa);
$P_{FEED}$ is the pressure of the feed stream entering the device (kPa);
$P_P$ is the permeate pressure (kpa);
$x_i$ is the mole fraction of component i in the stream in the bore of the fibers at position z;
$x_{i,FEED}$ is the mole fraction of component i in the feed stream entering the membrane device;
$x_{i,REJ}$ is the mole fraction of component i in the reject stream leaving the device;
$y_i$ is the mole fraction of component i in the stream outside of the fibers at position z;
$Y_{i,PERM}$ is the mole fraction of component i in the permeate stream leaving the device; and
$\mu$ is the viscosity of the stream in the bore of the fibers at position z (kg/m s).

To form the devices of this invention, hollow fiber membranes are formed into multiple bundles, each bundle having a radial Peclét number of preferably less than about 30, more preferably less than about 10, even more preferably less than about 5. Fiber bundles may possess a variety of cross-sectional shapes, such as cylindrical, hexagonal, square, triangular, or irregular. Preferably, the cross-sectional shape of the bundles is convex and substantially circular.

Each bundle preferably has a packing factor of at least about 30 percent, more preferably of at least about 50 percent. Each bundle preferably has an effective diameter of less than about 4.0 inches (10.2 centimeters), more preferably of less than about 2.5 inches (6.35 centimeters).

Each individual fiber bundle is substantially contained within an enclosure that is substantially impermeable to the fluid to be separated. Some areas of the fiber bundle do not need to be enclosed by the impermeable material, such as the fiber encased in the tubesheet and the area where the permeating fluid is removed from the bundle. This is because the function of the impermeable enclosure is to prevent fluid from passing between adjacent fiber bundles only in the main body of the bundle, where the separation is taking place. Examples of suitable impermeable enclosures include a flexible film which can be wrapped about the bundle, a hollow tube or pipe into which the bundle can be inserted, or other materials that can effectively separate the fluid in one bundle from the fluid in other bundles.

A tubesheet or tubesheets are affixed to each end of the hollow fiber membrane bundles or enclosures. Epoxy resins, polyurethanes, or other suitable resins are useful as tubesheet materials. The tubesheets are formed so that the hollow fiber membranes are embedded in and communicate through the tubesheet, the fibers being open on the opposite face of the tubesheet. The tubesheets can be formed before or after assembling together into a cluster or array multiple bundles within their respective enclosures. For example, the bundles within their respective enclosures can be assembled together into a cluster or array and each end potted in a tubesheet, as illustrated in the device depicted in FIG. 1. Alternatively, a tubesheet can be formed at each end of each individual bundle within its individual enclosure and then a multiplicity of the enclosures assembled together into a cluster or array to form a device, as illustrated in FIG. 2.

End capping means, arranged and adapted for attaching and sealing, are affixed to each end of the bundles or enclosures at or near each tubesheet.

The device includes a means for introducing a feed fluid mixture into the bores of the hollow fiber membranes at the first tubesheet. Preferably the means for introducing the feed fluid mixture is a hole, nozzle, port, or other opening located in the first end capping means.

The device includes a means for withdrawing non-permeate fluid from the bores of the hollow fiber membranes at the second tubesheet. Preferably the means for withdrawing non-permeate fluid is a hole, nozzle, port, or other opening located in the second end capping means.

The device also includes a means for withdrawing permeate fluid from the outside of the hollow fiber membranes, located at the end nearest the means for introducing fluid into the bores of the hollow fiber membranes. The means for withdrawing permeate fluid is preferably one or more holes, nozzles, ports, or other openings located in the impermeable enclosures.

The hollow fiber membrane devices of this invention are useful for separating fluids, including gases, vapors, and liquids, from fluid mixtures. In a preferred embodiment, the devices of this invention are useful for separating gases and/or vapors from mixtures of gases and/or vapors, including mixtures comprising hydrogen, helium, oxygen, nitrogen, air, argon, carbon monoxide, carbon dioxide, ammonia, water vapor, light hydrocarbons, natural gas, hydrogen sulfide, nitrogen oxides, sulfur oxides, organic vapors, fluorocarbons and refrigerant gases. Light hydrocarbons as used herein means saturated and unsaturated $C_{1-4}$ hydrocarbons. Nitrogen oxides as used herein means compounds containing only nitrogen and oxygen atoms. Sulfur oxides as used herein means compounds containing only sulfur and oxygen atoms. Organic vapors as used herein means compounds containing primarily carbon and hydrogen atoms.

For such applications, membranes with dense discriminating layers or regions are preferred, such as non-porous, asymmetric, and composite membranes. The devices of this invention are useful for many different gas separation applications, including, but not limited to, providing of an enriched nitrogen stream for inerting of flammable fluids, perishable foodstuffs, and metal treating processes, providing an enriched oxygen stream for medical uses, fermentation processes, or enhanced combustion processes, recovering carbon dioxide from light hydrocarbons, treating flue gases to remove nitrogen oxides and/or sulfur oxides, removing organic vapors from air, dehydrating air and natural gas, and the like.

For gas separation, the operating temperature is preferably between about $-25°$ and $100°$ C., more preferably between about $15°$ and $90°$ C. and the operating pressure is preferably between about 25 and 2000 psig (270 and 14,000 kPa), more preferably between about 50 and 500 psig (450 and 3600 kPa).

In another preferred embodiment, the devices of this invention are useful for separating gases and/or vapors from mixtures of liquids or mixtures of liquids gases using the membrane separation processes of membrane stripping, membrane distillation, or pervaporation. In membrane stripping, a microporous membrane is used and the material permeating through or across the membrane is removed from the device as a gas or vapor. In membrane distillation, a microporous membrane is used and the material permeating through or across the membrane is condensed and removed from the device as a liquid. In pervaporation, a non-microporous membrane is used and the material permeating through or across the membrane may be removed from the device as a gas or vapor or condensed and removed from the device as a liquid. For membrane stripping, membrane distillation, or pervaporation, the operating temperature is preferably between about $0°$ and $75°$ C., more preferably between about $5°$ and $50°$ C. and the operating pressure is preferably between about 5 and 80 psig (135 and 650 kPa), more preferably between about 5 and 50 psig (135 and 450 kPa).

The hollow fiber membrane devices of this invention may be operated in any configuration or combination, including but not limited to, parallel, series, recycle, or cascade operations. These hollow fiber membrane devices may also be operated in conjunction with other separation processes or unit operations including but not limited to, crystallization, fractionation, filtration, reactions, heat exchange, compression, expansion, pumping, swing adsorption, and the like.

DETAILED DESCRIPTION OF THE DRAWINGS

Figure 2:
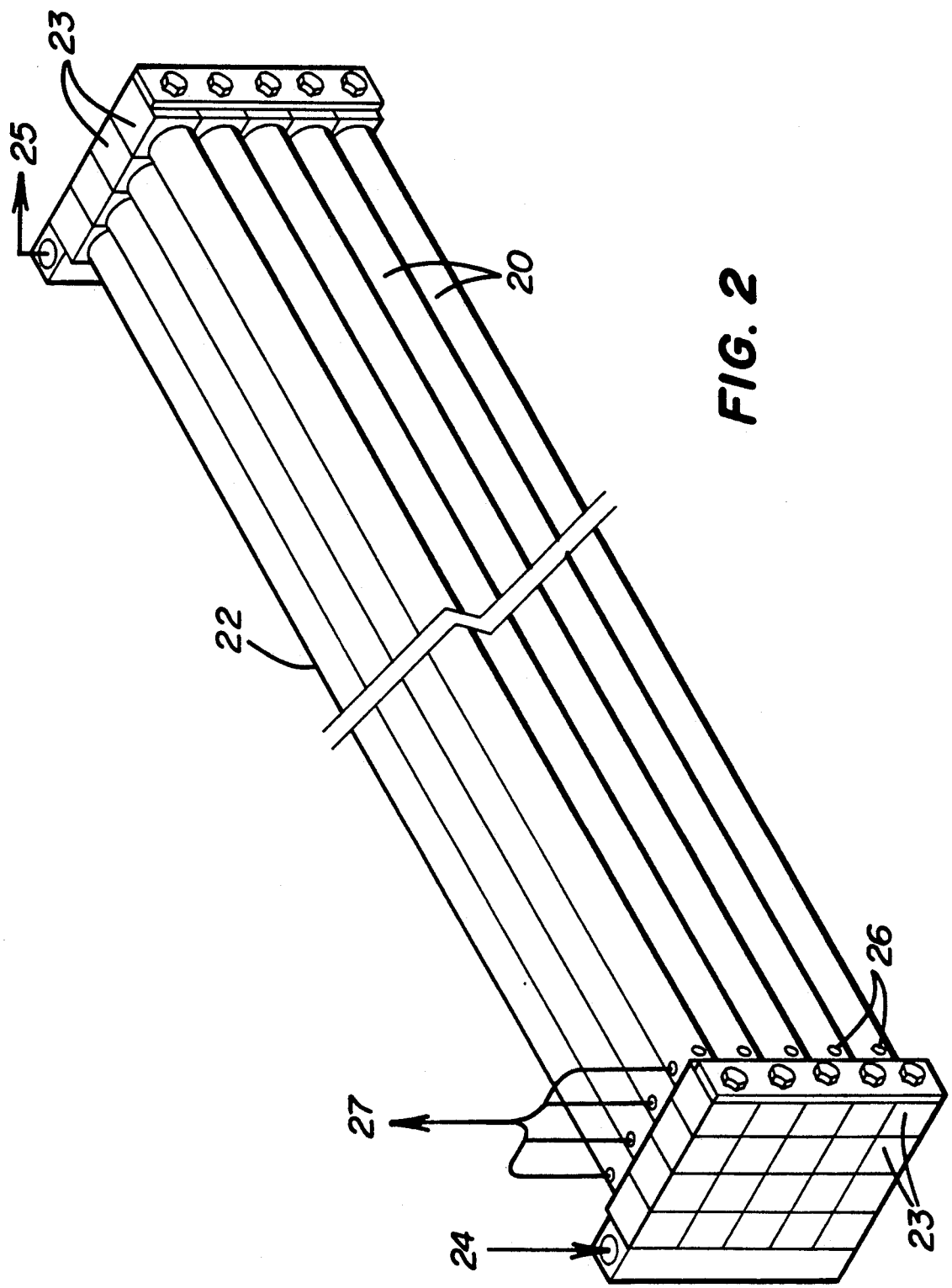
FIG. 2 illustrates an alternate embodiment of the hollow fiber membrane device of this invention.

FIG. 1 illustrates one embodiment of this invention, in which seven cylindrical tubes (10) containing bundles of hollow fibers (11) have been assembled as a single module (12). The ends of the assembly have been encased in tubesheets (13) consisting of cured epoxy resins or similar materials. The feed stream (14) enters the bore of the fibers at one end of the module and the non-permeate product stream (15) leaves the bore of the fibers at the other end of the module. Holes (16) in the cylindrical tubes (10) near one tubesheet allow the permeate (17) to leave the fiber bundles. Placement of these holes (16) near the feed end of the module encourages a generally countercurrent flow of the permeate fluid (17).

FIG. 2 illustrates another embodiment of this invention, in which cylindrical tubes (20) containing bundles of hollow fibers have had separate tubesheets (23) encased on each end. The tubesheets contain passages for gases to leave or enter the bore of the fibers. Two or more bundles with tubesheets are then assembled into a single module (22). The feed stream (24) enters the bore of the fibers through the tubesheets at one end of the module and the non-permeate product stream (25) leaves the bore of the fibers through the tubesheet at the other end of the module. Holes (26) in the cylindrical tubes (20) near one tubesheet allow the permeate (27) to leave the fiber bundles. Placement of these holes (26) near the feed end of the module encourages a generally countercurrent flow of the permeate fluid (27). This embodiment also allows flexibility in that a variable number of tubes may be joined together, allowing modules of varying capacities to be formed from one size of cylindrical tube.

Figure 3:
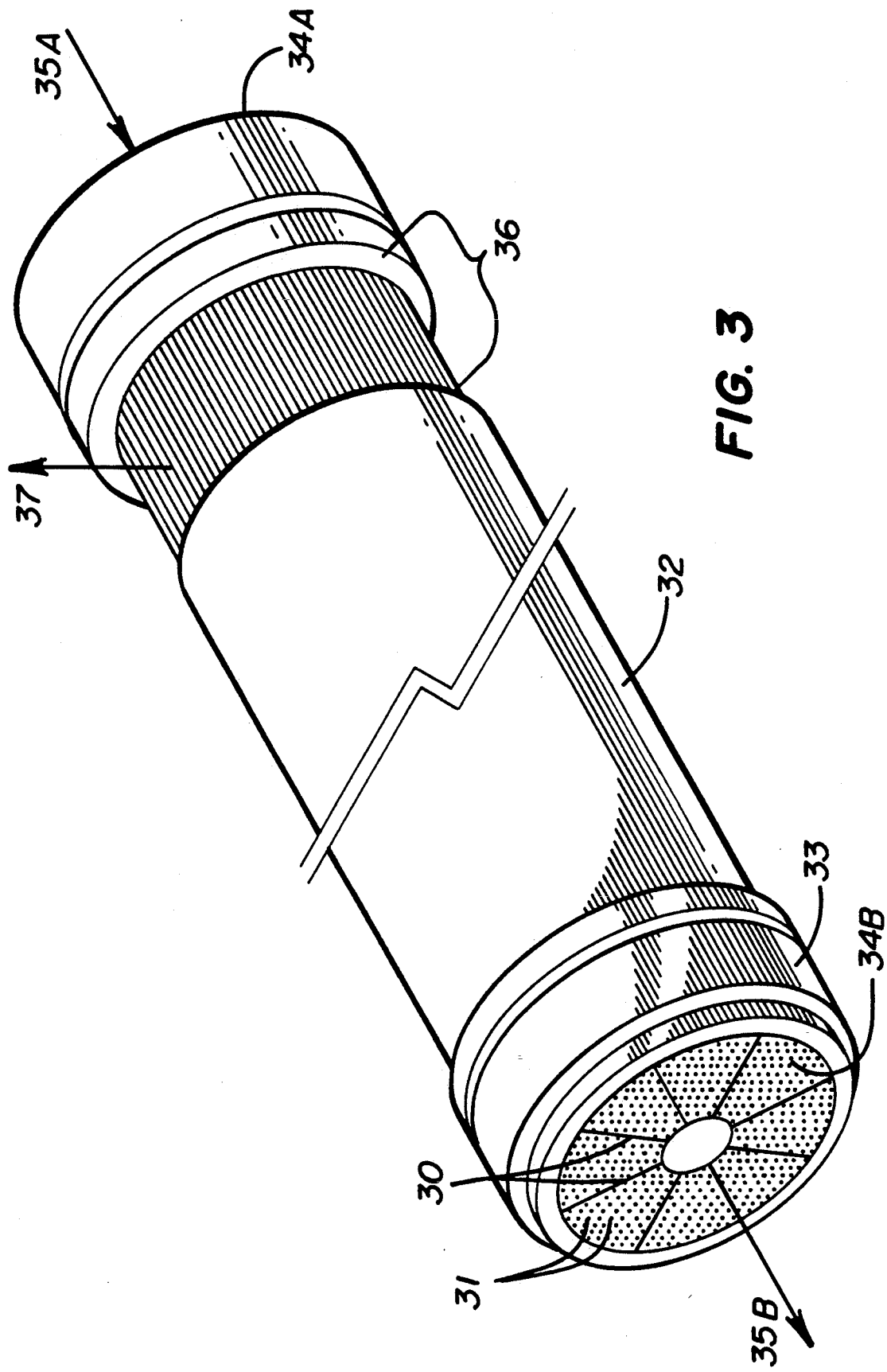
FIG. 3 illustrates an alternate embodiment of the hollow fiber membrane device of this invention.

FIG. 3 illustrates another embodiment of this invention, which contains multiple non-cylindrical fiber bundles. The module (32) contains eight hollow fiber bundles (31) each separated from each other using an impermeable material (30). The bundles (31) are embedded on each end in a suitable tubesheet material (33). The feed stream (35A) enters the bores of the hollow fibers at one end (34A) of the bundles (31) while the non-permeate stream (35B) exits the bores of the hollow fibers at the other end of the bundles (34B). An opening (36) near the feed end of the module encourages a counter current flow of permeate fluid (37) from the module.

SPECIFIC EMBODIMENTS

Example 1—Comparative Example with Conventional Device

This Example is for comparative purposes only and is not illustrative of the invention.

A conventional hollow fiber membrane device was fabricated from 351,600 hollow fibers having an oxygen/nitrogen separation factor at 25° C. of about 7.4 and an oxygen flux of about $$24 \times 10^{-6} \frac{cm^3(STP)}{cm^2 s\ cmHg}.$$

The fibers were parallel wrapped about a central core and held in place with epoxy tubesheets. The active fiber length was about 47 inches (119.4 centimeters). The device was evaluated for the separation of air into enriched oxygen and enriched nitrogen streams using air at about 25° C. and about 1031.5 SCFH (standard cubic feet per hour) (29.2 standard cubic meters per hour) as the feed gas. The device produced about 324.1 SCFH (9.2 standard cubic meters per hour) of 99 percent nitrogen as the non-permeate stream, and about 707.4 SCFH (20.0 standard cubic meters per hour) of enriched oxygen as the permeate stream. The recovery, measured as the percentage of the ratio of the non-permeate product flow rate to the feed flow rate, at 1 percent oxygen concentration in the non-permeate, was determined to be about 31.4 percent. The theoretical performance of the device, based on the membrane separation performance characteristics, was about 516 SCFH (14.6 standard cubic meters per hour) of 99 percent nitrogen as the non-permeate stream, about 749.5 SCFH (21.2 standard cubic meters per hour) of enriched oxygen as the permeate stream, and a recovery, at 1 percent oxygen concentration in the non-permeate, of about 40.8 percent. Thus, the percentage of actual performance to theoretical performance was about 62.8 percent for the non-permeate product stream flow, 94 percent for the permeate stream flow, and 77 percent for the recovery. The radial Peclét number for this device was calculated to be 67.

Example 2—Six Tube Cluster Device

A hollow fiber device having a design similar to that illustrated in FIG. 1, except that only six tubes were used, was fabricated using 351,600 hollow fibers having an oxygen/nitrogen separation factor at 25° C. of about 6.65 and an oxygen flux of about $$17.3 \times 10^{-6} \frac{cm^3(STP)}{cm^2 s\ cmHg}.$$

The hollow fibers were divided and inserted into six 1 and ¼ inch (3.2 centimeter) O. D. diameter tubes, as illustrated in Table 1. The tubes were assembled together in a cluster at each end and potted using epoxy resin to obtain a tubesheet. The active fiber length was about 47 inches (119.4 centimeters). The device was evaluated for the separation of air into enriched oxygen and enriched nitrogen streams using air at about 25° C. and about 955 SCFH (standard cubic feet per hour) (27.0 standard cubic meters per hour) as the feed gas.

The actual and theoretical performance of the device and each individual tube is indicated in Table I. The radial Peclét number for tubes 1, 2, 4, and 5 is 17. The radial Peclét number for tubes 3 and 6 is 12. The fiber in Tube 1 was believed to be damaged during fabrication due to difficulties encountered in inserting the bundle inside of the tube.

The device in this Example, which is an embodiment of this invention, achieves significantly higher performance as a fraction of the theoretical countercurrent performance than the device of similar capacity described in Example 1, which is not an embodiment of this invention. The higher performance achieved by devices of this invention will allow devices of a given capacity to be made from a smaller amount of hollow fiber and less feed air to be used to produce a given amount of product nitrogen.

TABLE I

|  | Non-Permeate (SCFH) | Permeate (SCFH) | Recovery (Percent) |
|---|---|---|---|
| Actual Performance of Device | 281.7 | 579.9 | 32.7 |
| Theoretical Performance of Device | 362.9 | 591.4 | 38.0 |
| Actual as Percentage of Theoretical Performance of Device | 77.6 | 99.0 | 86.0 |
| Actual Performance 60,900 Fibers Per Tube | | | |
| Tube 1 | 45.5 | 115.7 | 28.2 |
| Tube 2 | 49.4 | 98.4 | 33.4 |
| Tube 4 | 52.9 | 103.1 | 33.9 |
| Tube 5 | 51.1 | 103.7 | 33.0 |
| Theoretical Performance 60,900 Fibers Per Tube | | | |
| Tube 1 | 62.9 | 102.4 | 38.0 |
| Tube 2 | 62.9 | 102.4 | 38.0 |
| Tube 4 | 62.9 | 102.4 | 38.0 |
| Tube 5 | 62.9 | 102.4 | 38.0 |
| Actual Performance 54,000 Fibers Per Tube | | | |
| Tube 3 | 46.6 | 86.2 | 35.1 |
| Tube 6 | 47.0 | 87.2 | 35.0 |
| Theoretical Performance 54,000 Fibers Per Tube | | | |
| Tube 3 | 55.7 | 90.8 | 38.0 |
| Tube 6 | 55.7 | 90.8 | 38.0 |

Example 3—Single Tube Devices

A number of single tube membrane devices were fabricated using bundles of varying diameters in order to investigate the impact of radial Peclét number on module performance. These single tube devices are not an embodiment of this invention, but are included here to demonstrate that fiber bundles with small radial Peclét numbers achieve better performance than fiber bundles with large Peclét numbers. This Example also supports the finding that modules formed from several independent small bundles will achieve better performance than a module containing a single large bundle.

All devices were fabricated from tetrabromobisphenol A polycarbonate hollow fiber membranes having a nominal fiber size of 135 microns O.D. by 95 microns I.D. Each bundle was inserted into a plastic tube having a nominal diameter of 0.75 to 4.0 in. (1.9 to 10.2 cm). Each end was encased in epoxy resin to form a tubesheet. The active length of each device was about 26 in. (66 cm).

Each device was evaluated for the separation of air into enriched oxygen and enriched nitrogen using air at about 25° C. and 135 psig as the feed gas. The actual performance of each device was compared to the theoretical performance based on measurements of the single gas permeabilities for the fibers. The performance of these modules relative to ideal countercurrent performance is summarized in Table II. Table II shows the average relative recovery and relative productivity based on tests of 5 to 8 samples per module size as well as the average radial Peclét number for a given module size. Modules with radial Peclét numbers less than about 12 perform much better than modules with radial Peclét numbers significantly greater than 12. For example, a module with a radial Peclét number of about 40 has less than 70 percent of ideal performance. A module with a radial Peclét number of 3 performs at over 93 percent of ideal performance.

The relative performance data in Table II is shown in FIGS. 4A and 4B with appropriate error bars and a trend line. Statistically speaking, modules with radial Peclét numbers less than about 12 have about the same relative performance. The performance decline at a radial Peclét number of about 40 is statistically significant. Noting that the error bars are similar over the range of Peclét numbers 12 to 40, these statistical results show that the critical Peclét number is in the range of 25 to 31 as shown in FIGS. 4A and 4B.

ers are sealed around the tubesheets so that a high pressure feed stream may be introduced into the bore of the fibers at one end, and a high pressure nonpermeate product stream may be removed from the bore of the fibers at the other end. Holes are made around the circumference of the impermeable outer sleeve near the feed end of the assembly so that the permeating gas may be removed from the assembly.

Because the resistance to flow is much smaller in the open region between the porous and impermeable sleeves than in the area packed with fibers, the permeating fluid will flow radially outward from the fiber bundle into the open region. The permeating fluid will collect in the open region and, because of the location of the holes in the outer sleeve, flow axially down the open region in a direction countercurrent to the flow of the feed gas. Axial diffusion, dispersion, and mixing is assumed to be negligible in this system. Radial velocities in the fiber bundle are described by the continuity equation and permeate compositions are described by the species continuity equations. Axial velocities and compositions in the annular open channel are described by one-dimensional shell balances, with the permeate from the bundle treated as source terms. The fibers are assumed to be uniform. Velocity, pressure and composition within the bore of the fiber are described by one-dimensional shell balances with the permeation out of the fiber treated as source terms. Permeation rates are described by the standard gas permeability model, with differences in the partial pressures of the components as the driving forces. Pressure drops in the bore of the fibers are described by the Hagen-Poiseuille law for laminar flow in tubes. The equations describing this model are readily solved using a variety of standard numerical methods. Here, orthogonal collocation was used.

At 25° C., the fiber has an oxygen/nitrogen selectivity of about 7.4 and an oxygen flux based on the outside

TABLE II

| Nominal Tube Size (in.) | Number of Modules | Packing Factor (percent) | Oxygen/Nitrogen Selectivity | Oxygen Flux* | Radial Peclét Number | Percent of Theoretical Productivity | Percent of Theoretical Recovery |
|---|---|---|---|---|---|---|---|
| 1 | 6 | 40 | 7.4 | 21.2 | 3 | 95 | 93 |
| 1.25 | 8 | 40 | 7.2 | 17.7 | 5 | 94 | 92 |
| 1.5 | 5 | 40 | 7.3 | 18.2 | 7 | 94 | 92 |
| 2.0 | 6 | 40 | 7.5 | 19.8 | 12 | 91 | 86 |
| 4.0 | 5 | 40 | 7.5 | 18.5 | 40 | 66 | 68 |

* $\frac{cm^3 \, (STP)}{cm^2 s \, cmHg}$

Example 4—Simulation of Channeling

This Example is a simulation of the performance of a single cylindrical bundle of hollow fiber membranes with intentionally induced channeling. This Example demonstrates that devices with small radial Peclét numbers are capable of performance close to the countercurrent ideal limit. Since the flow fields simulated in this Example represent the worst channeling possible, this Example demonstrates the worst performance degradation caused by channeling in a hollow fiber bundle.

Hollow fiber membranes comprising tetrabromobisphenol A polycarbonate are formed into a cylindrical bundle. The bundle is encased in a porous cylindrical inner sleeve of a fixed diameter. The bundles are centered inside an impermeable outer sleeve of a larger diameter, leaving an annular channel open for flow between the porous and impermeable sleeves. The two ends of the bundles are encased in tubesheets and headdiameter of about $20 \times 10^{-6}$ cc(STP)/cm$^2$s cmhg. The fiber has an outside diameter of 135 mm and an inner diameter of 95 mm. Fibers are assembled in bundles with a packing factor of about 35 percent and an active length of about 62 inches (157.5 centimeters). A gas containing by volume about 20.95 percent oxygen and 79.05 percent nitrogen is fed to the boreside of the fibers at 135 psig. The pressure outside the fibers is maintained at about 1 atm. Molar gas density is calculated using the ideal gas law. Viscosity and diffusivity are calculated from kinetic theory of gases.

Figure 5:
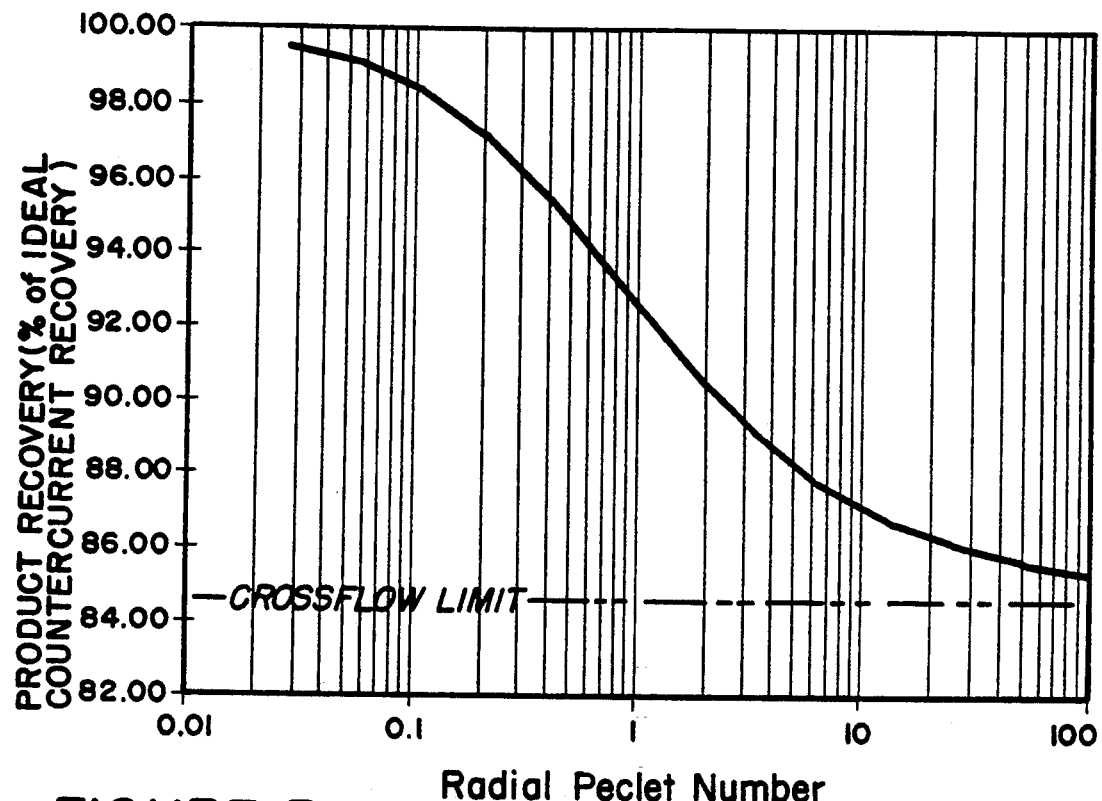
Figure 6:
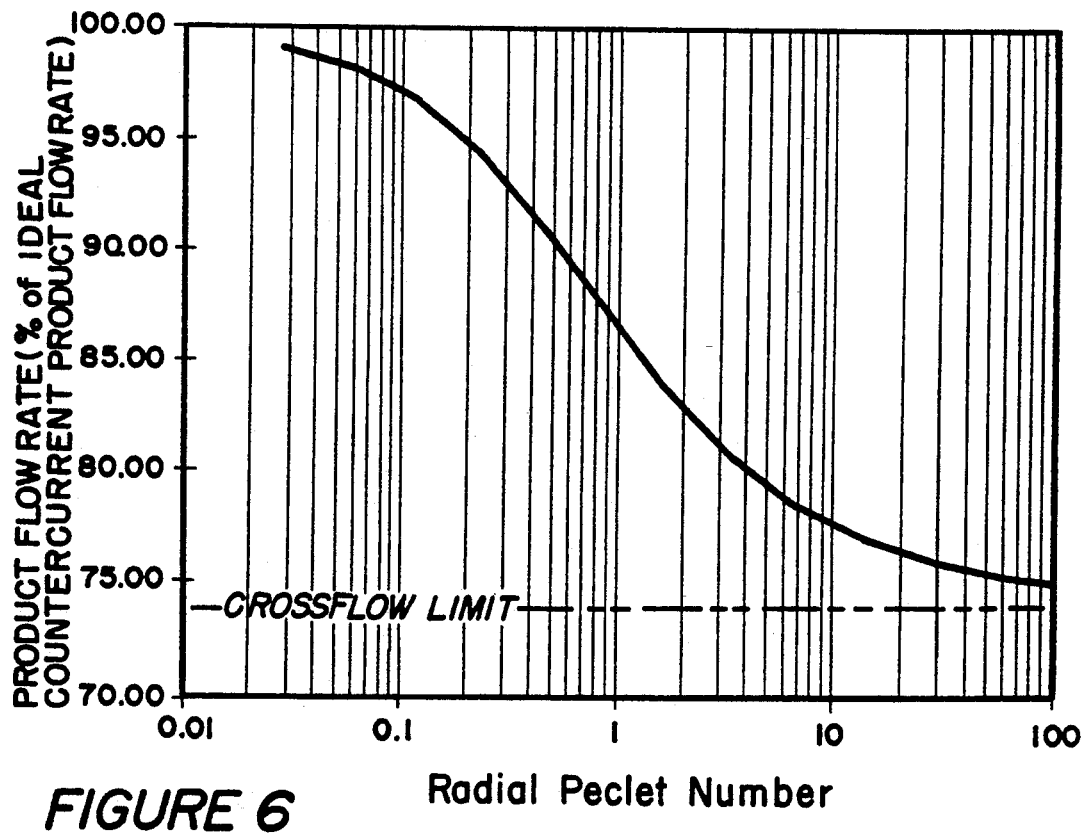
Figure 7:
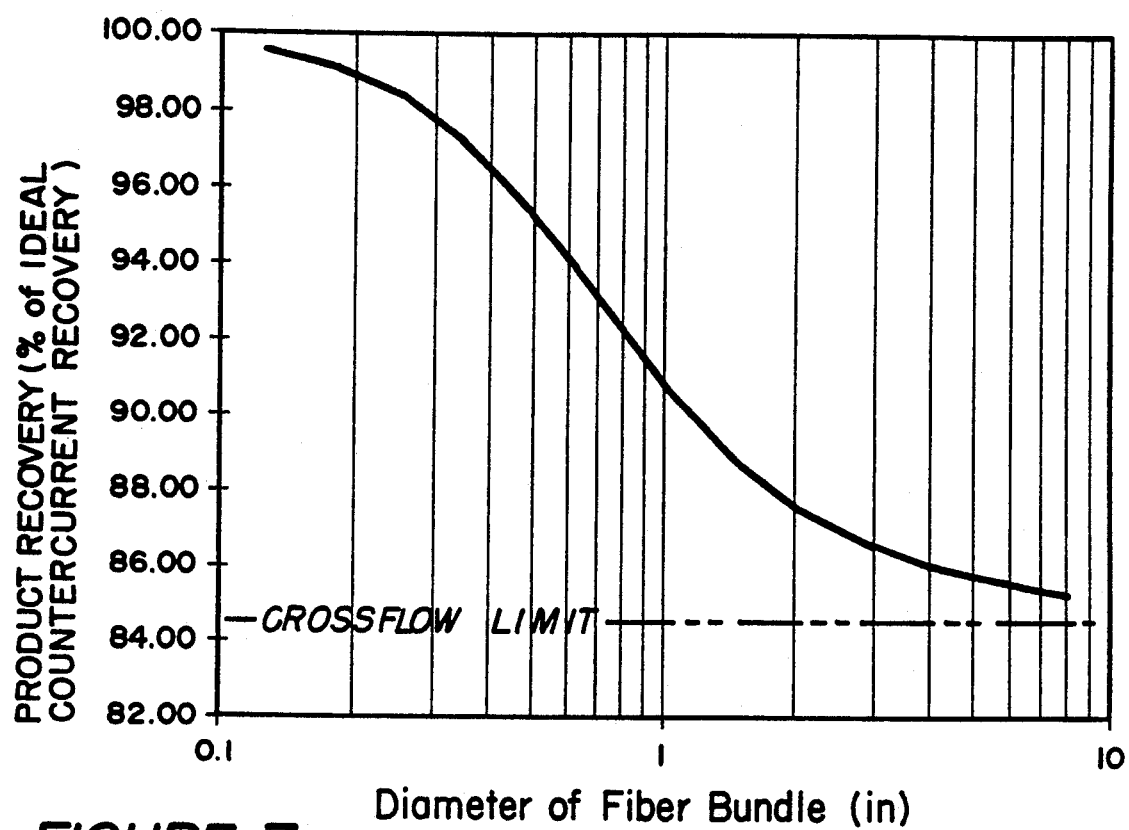
Figure 8:
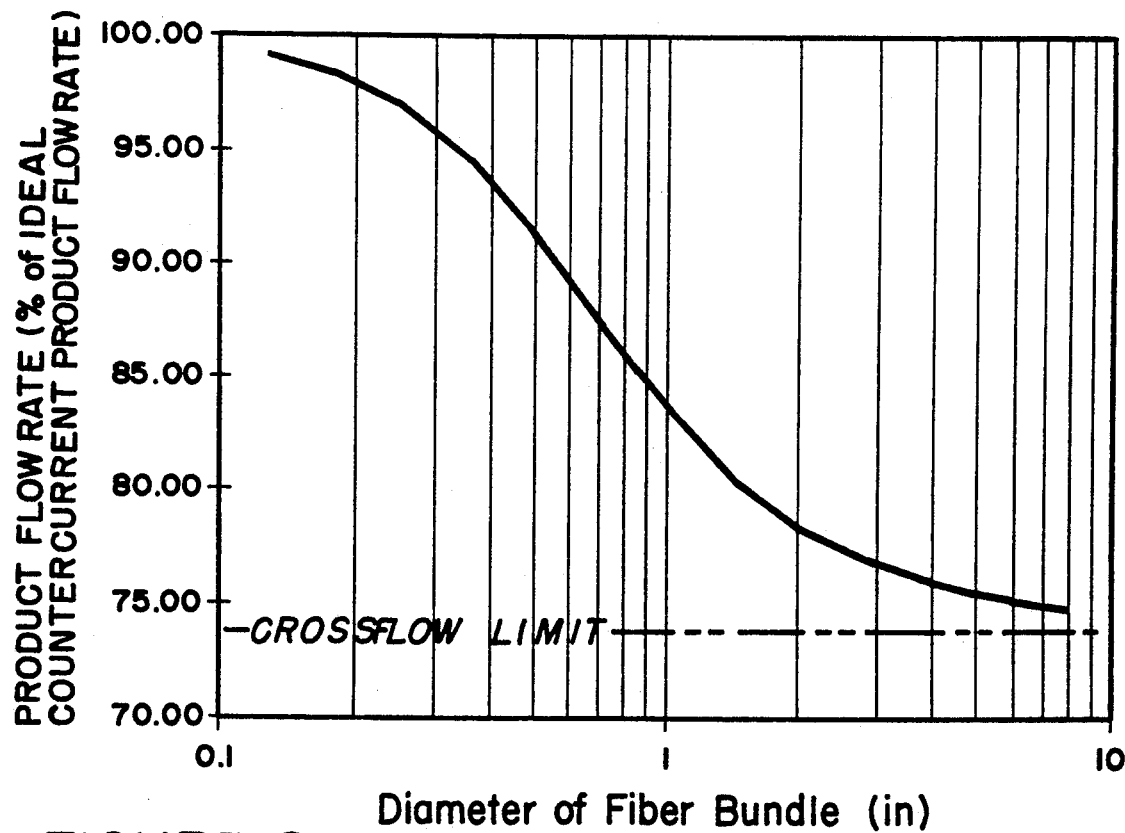

The predicted performance of devices meeting the above description are shown in FIGS. 5 through 8. FIGS. 5 and 6 show the normalized recovery and productivity as a function of radial Peclét number. FIGS. 7 and 8 show the normalized recovery and productivity as a function of fiber bundle diameter. This demonstrates that bundles with suitably small Peclét numbers can achieve performance approaching the countercurrent ideal even when extreme channeling is present.

The drop in performance predicted by this Example occurs at radial Peclét numbers around 1, whereas the measurements of Example 3 show a drop in performance at radial Peclét numbers around 40. This discrepancy is due to the assumption of the worst channeling flow fields possible for this Example, while the module design of Example 3 encourages countercurrent flow. The results of Example 3 are expected to reflect the performance of designs where countercurrent flow of permeate through the bundle is generally encouraged.

What is claimed is:

1. A hollow fiber membrane device comprising means for providing countercurrent flow distribution on the shellside of said device relative to the feed fluid mixture within the bores of the hollow fiber membranes of said device, including:
   A. at least two bundles, each bundle comprising a plurality of hollow fiber membranes capable of separating at least one fluid from a feed fluid mixture, each bundle having a first end and a second end and a radial Peclét number of less than about 30, each bundle being contained within a separate and distinct enclosure substantially impermeable to the fluids being separated and arranged together for substantially parallel flow of a feed fluid mixture through each bundle;
   B. a first tubesheet comprised of a thermoset or thermoplastic polymeric material located at the first ends of the bundles, arranged such that the hollow fiber membranes are embedded in the first tubesheet and communicate through the first tubesheet and are open on the opposite face of the first tubesheet;
   C. a second tubesheet comprised of a thermoset or thermoplastic polymeric material located at the second ends of the bundles opposite the first ends of the bundles, arranged such that the hollow fiber membranes are embedded in the second tubesheet and communicate through the second tubesheet and are open on the opposite face of the second tubesheet;
   D. a first end capping means arranged and adapted for attaching and sealing to the first end of the bundles or enclosures at or near the first tubesheet;
   E. a second end capping means arranged and adapted for attaching and sealing to the second end of the bundles or enclosures at or near the second tubesheet;
   F. a means for introducing a feed fluid mixture into the bores of the hollow fiber membranes at the first tubesheet;
   G. a means of withdrawing non-permeate fluid from the bores for the hollow fiber membranes at the second tubesheet; and
   H. a means for withdrawing permeate fluid from the outside of the hollow fiber membranes located at the end nearest the means for introducing fluid into the bores of the hollow fiber membranes at the first tubesheet.

2. The device of claim 1 wherein the feed fluid mixture to be separated comprises a mixture of two or more gases.

3. The device of claim 2 wherein the feed gas mixture to be separated comprises hydrogen, helium, oxygen, nitrogen, carbon monoxide, carbon dioxide, hydrogen sulfide, ammonia, water vapor, a nitrogen oxide, a sulfur oxide, a light hydrocarbon, natural gas, an organic vapor, a fluorocarbon, or a refrigerant gas.

4. The device of claim 3 wherein each bundle has an effective diameter of less than about 3.5 inches.

5. The device of claim 4 wherein each bundle has a packing factor of at least about 30 percent.

6. The device of claim 5 wherein the hollow fiber membrane bundles are parallel wrapped.

7. The device of claim 5 wherein the hollow fiber membrane bundles are bias wrapped.

8. The device of claim 6 wherein the enclosures comprise a substantially rigid material.

9. The device of claim 8 wherein the enclosures comprise hollow tubes or pipes.

10. The device of claim 8 wherein the enclosures comprise polymeric films.

11. The device of claim 3 wherein the hollow fiber membranes comprise a polyether, polysulfone, polyethersulfone, polybenzoxazole, polyimide, polyester, polyestercarbonate, polycarbonate, polyarylate, or copolymer or physical blend thereof.

12. The device of claim 11 wherein the hollow fiber membranes comprise polybenzoxazole or at least one polymer containing 9,9-bis-(dibromo-4-hydroxyphenyl)fluorene, 9,9-bis-(dichloro-4-hydroxyphenyl)fluorene, hexafluoro bisphenol A, tetrahalobisphenol A, tetrahalo hexafluoro bisphenol A, tetraalkyl bisphenol A, or tetraalkyl hexafluoro bisphenol A moieties selected from the group consisting of polycarbonate, polyimide, polyether, polysulfone, polyethersulfone, polyarylate, polyester, polyestercarbonate, or a copolymer or physical blend thereof.

13. The device of claim 12 wherein the bundle diameters are less than about 3.5 inches.

14. The device of claim 13 wherein the packing factor is at least about 30 percent.

15. The device of claim 14 wherein the Peclet is less than about 30.

16. The device of claim 15 wherein the device possesses at least 70 percent of the theoretical countercurrent recovery or 70 percent of the theoretical countercurrent productivity.

* * * * *